INVENTOR.
JERRALD M. PULLEN
BY
Christie, Parker & Hale
ATTORNEYS

United States Patent Office 3,513,370
Patented May 19, 1970

3,513,370
POSITIONAL SERVO WHEREIN FEEDBACK IS BY A VARIABLE CAPACITOR WHICH CONTROLS THE WIDTH OF A ONE-SHOT MULTIVIBRATOR
Jerrald M. Pullen, Sun Valley, Calif., assignor to Kraft Systems, Inc., Los Angeles, Calif., a corporation of California
Filed Nov. 22, 1967, Ser. No. 685,063
Int. Cl. G05b 11/12
U.S. Cl. 318—18                               15 Claims

ABSTRACT OF THE DISCLOSURE

The position of a motor shaft is controlled by a servo system responsive to pulse duration modulated command signals. The actual motor shaft position is sensed by a variable capacitor that is mechanically coupled to the motor shaft. The variable capacitor forms part of the timing circuit of a one-shot multivibrator. The command signal and the output of the one-shot multivibrator are combined and the difference signal is applied through a pulse stretching circuit to a motor drive amplifier. The variable capacitor is modified by connecting a flexible jumper wire from its rotor shaft to one of its stationary terminal tabs to parallel the existing rotary bearing connection. The one-shot multivibrator is triggered by the leading edges of the command signal pulses applied to the collector of the normally cut-off transistor stage of the multivibrator. The pulse stretching circuit comprises a normally cut-off, push-pull transistor stage with a single pulse stretching capacitor coupled across the output of the stage. The motor drive amplifier also comprises normally cut-off, push-pull transistor stages connected in tandem with the pulse stretching circuit. A feedback connection is provided from the output of the motor drive amplifier to the command signal input so as to advance the difference signal slightly toward null relative to the motor shaft position.

BACKGROUND OF THE INVENTION

This invention relates to feedback control systems and, more particularly, to improvements in positional servo arrangements.

Servo systems for controlling the position of a movable element are in wide use. One of many fields in which positional servo systems are employed is the operation of model vehicles, such as airplanes, boats, and automobiles by remote control. The operator sends an electrical command signal from a transmitter in his possession to the remotely located vehicle where a servo controlled motor moves the steering mechanism of the vehicle responsive to the command signal.

The slider arm of a potentiometer is conventionally coupled to the motor shaft to produce an electrical signal representative of the actual motor shaft position. The command signal received at the remotely located vehicle is combined with the signal representative of the actual motor shaft position. A motor drive signal is produced responsive to the difference between the combined signals, thereby driving the motor until the actual shaft position corresponds to the shaft position represented by the command signal. Unfortunately, the potentiometers are susceptible to the rapid buildup of dirt and other foreign matter, which leads to erratic and unpredictable servo operation. Further, the maintenance requirements of the servo system are increased by the limited service life of such potentiometers.

SUMMARY OF THE INVENTION

The invention utilizes a variable capacitor to sense the actual shaft position of a servo motor. The capacitor, which is mechanically coupled to the motor shaft, forms part of the timing circuit of a one-shot multivibrator that produces pulses related in duration to the value of the variable capacitor. A source of command signals provides pulses that convey the desired motor shaft position in the form of pulse duration modulation. The command signals are combined with the output pulses from the multivibrator and the motor drive signal is produced responsive to the difference in the duration of the combined signals. Thus, whenever the pulse duration of the command signal changes, the motor is driven until a corresponding change in the pulse duration of the ouput pulses from the multivibrator takes place. A substantial decrease in the maintenance requirements and improvement in the reliability of the servo operation result from the use of a variable capacitor to sense the motor shaft position in the described manner. These results are even further enhanced by the discovery that the service life of the conventional variable capacitor can be substantially extended by connecting a flexible jumper wire from the rotor shaft of the capacitor to one of the fixed terminals in parallel with the existing rotary bearing connection.

A feature of the invention is the application of the trigger pulses to the one-shot multivibrator at the collector of its normally cut off transistor stage. As a result, the trailing edge of the trigger pulses does not affect the operation of the one-shot multivibrator, because the collector is clamped to the emitter potential after the multivibrator is triggered.

Another feature of the invention is the provision of a pulse stretching circuit and a motor drive amplifier having alternatively conducting push-pull transistor sections. A single pulse stretching capacitor is connected across the output of the pulse stretching circuit. This circuit configuration inherently prevents an overload at the output of the motor drive amplifier such as might occur with separate pulse stretching circuits and motor drive amplifiers for each direction of shaft rotation.

A negative feedback connection from the output of the motor drive amplifier to the point where the command signal and the output pulses from the one-shot multivibrator are combined advances the signal applied to the pulse stretching circuit slightly toward null with respect to the drive signal applied to the motor. Thus a damping action takes place that prevents overshoot in the course of motor adjustment.

BRIEF DESCRIPTION OF THE DRAWINGS

The features of a specific embodiment of the invention are illustrated in the drawings, in which:

FIG. 3 is a schematic diagram of the variable capacitor illustrating the modification for prolonging its service life.

DESCRIPTION OF A SPECIFIC EMBODIMENT

Figure 1:
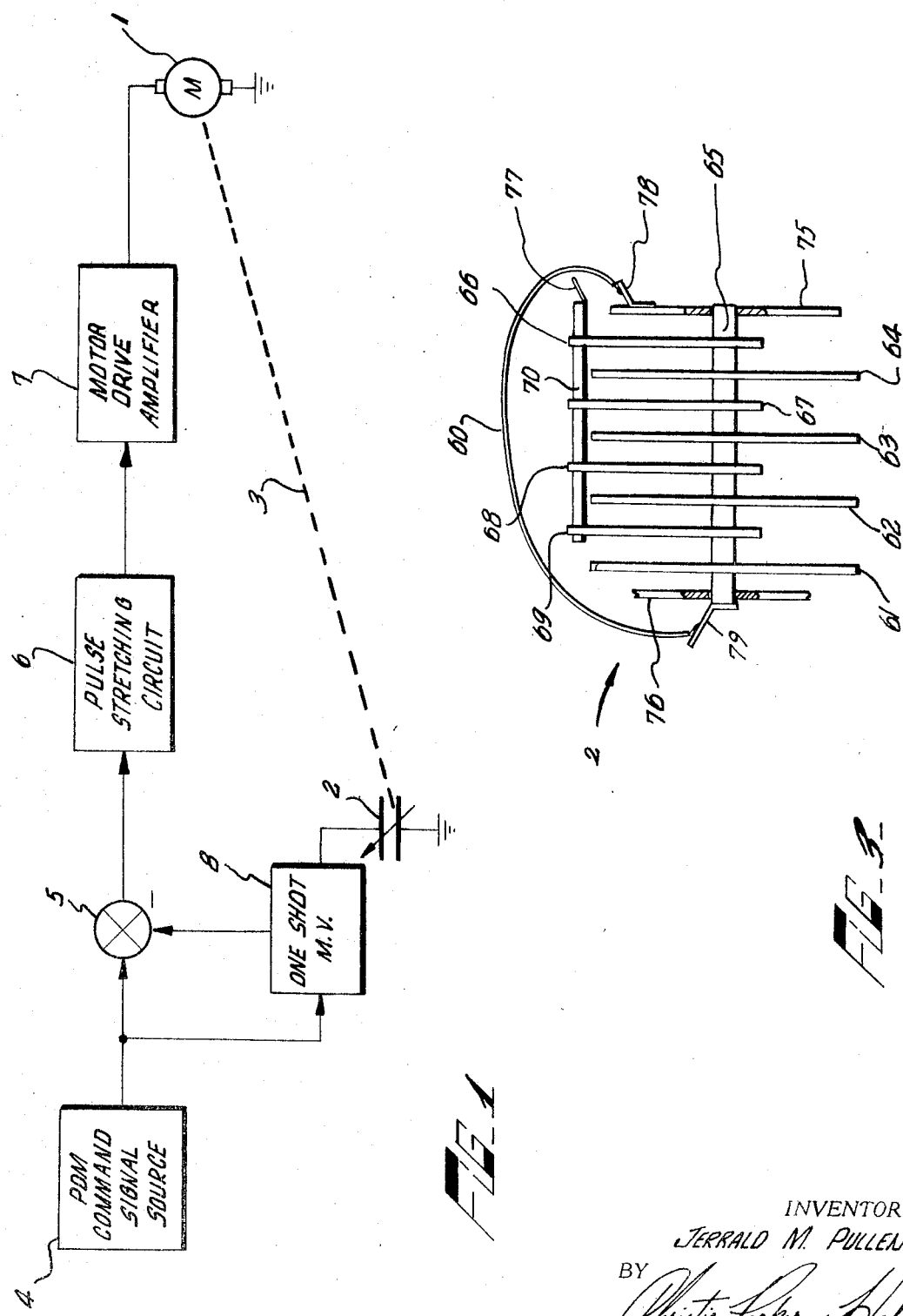
FIG. 1 is a schematic diagram of a positional servo system partially in block form.

Reference is now made to FIG. 1 where a servo system is shown for controlling the shaft position of a motor 1 which could drive the steering element of a model airplane, automobile or some other movable device. A variable capacitor 2 is mechanically coupled to the shaft of motor 1 so the value of its capacitance changes as a function of the motor shaft position. The mechanical coupling between motor 1 and capacitor 2 is represented by a dashed line 3. Capacitor 2 forms part of the timing circuit of a one-shot multivibrator 8. A pulse duration modulation command signal source 4 provides pulses that convey the desired shaft position of motor 1 in the form of pulse duration modulation. In other words, source 4 produces pulses the duration of which determine the desired motor shaft position. Source 4 could be, for example, a receiver on a model airplane remotely located from its operator. The command signal from source 4 and the output pulses from one-shot multivibrator 8 are combined at a summing junction 5 in such a way that the duration of the resulting pulses equals substantially the difference between the duration of the command signal pulses and the output pulses from multivibrator 8. Source 4 is also coupled to the trigger input of multivibrator 8. The leading edge of each command signal pulse triggers multivibrator 8. The duration of the output pulses produced by multivibrator 8 is determined by the shaft position of motor 1. The output of summing junction 5 is coupled through a pulse stretching circuit 6 to a motor drive amplifier 7 that energizes motor 1. When the duration of the output pulses produced by multivibrator 8 is different from the duration of the command signal pulses, amplifier 7 produces a motor drive signal that adjusts the motor shaft position, and therefore the value of capacitor 2, so as to reduce the difference.

Figure 2:
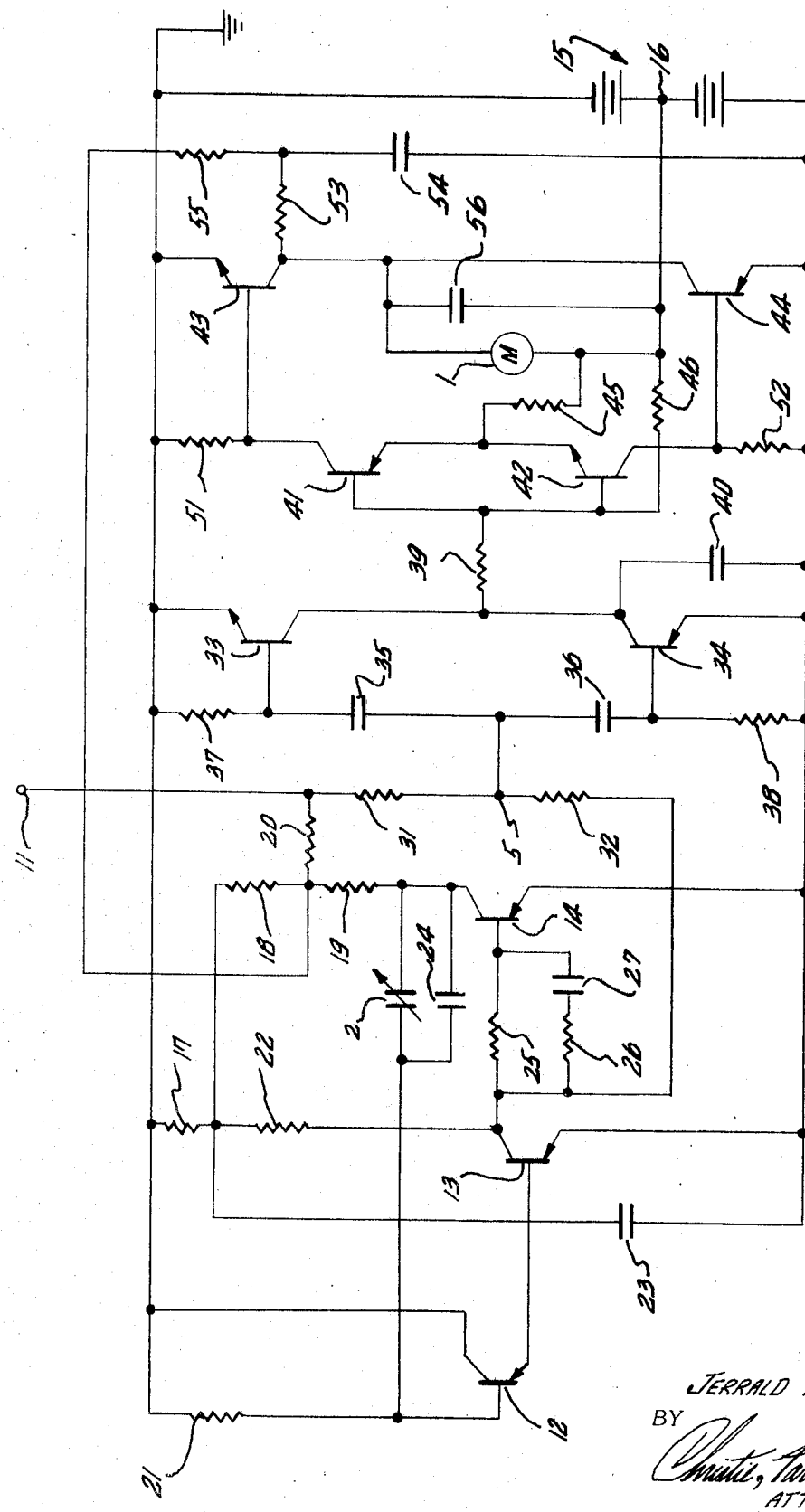
FIG. 2 is a schematic circuit diagram of the circuitry depicted in block form in FIG. 1.

In FIG. 2 one-shot multivibrator 8, summing junction 5, pulse stretching circuit 6, and motor drive amplifier 7 are shown in detail. The command signal pulses are applied to an input terminal 11. Multivibrator 8 includes transistors 12, 13, and 14. Transistor 14 connected in the common-emitter configuration comprises one stage. Its emitter is directly connected to the positive terminal of a battery 15 with a center tap 16. The negative terminal of battery 15 is connected to ground. Resistors 17, 18, and 19 are connected in series between ground and the collector of transistor 14. A resistor 20 couples input terminal 11 to the junction of resistors 18 and 19. Transistors 12 and 13 function substantially as a single Darlington-type amplifier stage. The base of transistor 13 is directly connected to the emitter of transistor 12, the collector of transistor 12 is directly connected to ground, and the emitter of transistor 13 is directly connected to the positive terminal of battery 15. The base of transistor 12 is connected to ground by a resistor 21. The collector of transistor 13 is connected to the junction of resistors 17 and 18 by a resistor 22. A smoothing capacitor 23 is shunted across the positive and negative terminals of battery 15. The collector of transistor 14 is coupled to the base of transistor 12 by variable capacitor 2 and a capacitor 24 in parallel. Capacitor 24 is selected so capacitor 2 is able to operate about the middle point of its range. The collector of transistor 13 is coupled to the base of transistor 14 by a resistor 25 connected in parallel with the series combination of a resistor 26 and a capacitor 27.

Summing junction 5 is formed at the point of connection of resistors 31 and 32. The command signal pulses applied to input terminal 11 are coupled to summing junction 5 by resistor 31, while the multivibrator output pulses appearing at the collector of transistor 13 are coupled to summing junction 5 by resistor 32.

Pulse stretching circuit 6 includes opposite conductivity type transistors 33 and 34 arranged to form a push-pull stage. Summing junction 5 is connected to the bases of transistors 33 and 34 by capacitors 35 and 36, respectively. A resistor 37 is connected between the base of transistor 33 and ground and a resistor 38 is connected between the base of transistor 34 and the positive terminal of battery 15. The collectors of transistors 33 and 34 are connected together and coupled by a resistor 39 to the input of motor drive amplifier 7. A pulse stretching capacitor 40 is shunted across the collector and emitter of transistor 34.

Motor drive amplifier 7 has two push-pull stages. The first stage includes opposite conductivity type transistors 41 and 42. The second stage includes opposite conductivity type transistors 43 and 44. Preferably, transistors 41 and 42 and transistors 43 and 44 exhibit complementary symmetry. The bases of transistors 41 and 42 are connected together, thereby forming the input of amplifier 7 to which pulse stretching circuit 6 is coupled by resistor 39. The emitters of transistors 41 and 42 are both connected to center tap 16 through a resistor 45. The bases of transistors 41 and 42 are also both connected to center tap 16 through a resistor 46. A load resistor 51 couples the collector of transistor 41 to ground and a load resistor 52 couples the collector of transistor 42 to the positive terminal of battery 15. The base of transistor 43 is directly coupled to the collector of transistor 41 and the emitter of transistor 43 is directly coupled to ground. The base of transistor 44 is directly coupled to the collector of transistor 42 and the emitter of transistor 44 is directly coupled to the positive terminal of battery 15. Motor 1 is connected between the junction of the collectors of transistors 43 and 44 and center tap 16 of battery 15. The mechanical coupling between the shaft of motor 1 and variable capacitor 2 is not represented in FIG. 2. A resistor 53 and a capacitor 54, which serve as a low pass filter for shaping a feedback signal, are connected in series between the junction of the collectors of transistors 43 and 44 and the positive terminal of battery 15. A resistor 55 connected between the junction of resistor 53 and capacitor 54 and the junction of resistors 18, 19 and 20 forms the feedback path to transmit the shaped signal. A smoothing capacitor 56 is shunted across the terminals of motor 1.

Transistors 12 and 13 are normally conducting and transistor 14 is normally cut off. It is assumed that the command pulses have a positive polarity. The leading edge of each command pulse triggers one-shot multivibrator 8. As the potential at input terminal 11 becomes positive at the leading edge of a command pulse, the potential at the base of transistor 12, which is coupled to input terminal 11 through capacitors 2 and 24, resistor 19, and resistor 20, becomes sufficiently positive to cut off transistors 12 and 13. As a result, the potential at the collector of transitor 13 and the base of transistor 14 drop substantially to ground. Then, transistor 14 begins to conduct and its collector rises substantially to the potential at the positive terminal of battery 15. As transistor 14 begins to conduct, the potential at its collector is initially coupled through capacitors 2 and 24 to the base of transistor 12. Thereafter, the potential at the base of transistor 12 drops exponentially as capacitors 2 and 24 charge up through resistor 21. Transistors 12 and 13 to remain cut off until the potential at the base of transistor 12 drops slightly below the potential at the positive terminal of battery 15. At such time, transistors 12 and 13 begin to conduct and transistor 14 becomes cut off again. The time duration during which transistors 12 and 13 are cut off, i.e., the timing cycle of the one-shot multivibrator, is dependent principally upon the component values in the timing circuit comprising resistor 21 and capacitors 2 and 24. Since variable capacitor 2 is mechanically coupled to the shaft of motor 1, the duration of the pulses produced at the collector of transistor 13 when it becomes cut off is related to the shaft position of motor 1. A feature of the invention is the application of the trigger pulses for the one-shot multivibrator at the collector of the normally cut-off transistor stage of the multivibrator, namely, the collector of transistor 14. As a result, the leading edge of the trigger pulses, i.e., the command signal pulses, initiates the timing cycle of the multivibrator, but the trailing edge of the trigger pulses has no effect if they occur during the timing cycle because the point of application of the trigger pulses namely, the collector of the normally cut-off transistor stage is essentially clamped to the potential at its emitter, i.e., the potential at the positive terminal of battery 15.

The output pulses from the one-shot multivibrator are coupled by resistor 32 to junction 5 and the command signal pulses applied to input terminal 11 are coupled by resistor 31 to junction 5. Transistors 33 and 34 are normally cut off and the voltage across capacitor 40 is normally equal to the voltage drop between the positive terminal of battery 15 and center tap 16. While transistor 13 is cut off and a command signal pulse is present at input terminal 11, the potential at summing junction 5 is at a quiescent or null value that does not affect the cut-off condition of either transistor 33 or transistor 34. While transistor 13 is conducting and no command signal pulse is present at input terminal 11, the potential at summing junction 5 is also at the quiescent value that does not affect the cut-off condition of either transistor 33 or transistor 34. When a command signal pulse has a longer duration than the corresponding output pulse from the one-shot multivibrator, the potential at summing junction 5 becomes positive with respect to its quiescent value to produce a positive error pulse and transistor 33 conducts for the difference in the duration. While transistor 33 is conducting, capacitor 40 charges and the voltage across it rises above its quiescent value. After transistor 33 becomes cut off again, capacitor 40 discharges slowly through resistors 39 and 46 and the voltage across it returns gradually toward its quiescent value. When an output pulse from the one-shot multivibrator has a longer duration than the corresponding command signal pulse, the potential at summing junction 5 becomes negative with respect to its quiescent value to produce a negative error pulse and transistor 34 conducts for the difference in the duration. While transistor 34 is conducting, capacitor 40 discharges and the voltage across it drops below its quiescent value. After transistor 34 becomes cut off again, capacitor 40 recharges slowly through resistors 39 and 46 and the voltage across it returns gradually toward its quiescent value. Thus, the two sides of the push-pull stage, namely, transistors 33 and 34, conduct alternatively.

In motor drive amplifier 7, transistors 41, 42, 43, and 44 are all normally cut off. When the voltage across capacitor 40 rises above its quiescent value by a predetermined amount, transistors 41 and 43 begin to conduct. While transistor 43 is conducting, it connects motor 1 between center tap 16 and the negative terminal of battery 15. Thus, a substantial energizing current flows through the winding of motor 1 in one direction, thereby rotating the motor shaft in a sense to reduce the difference in duration between the command pulse and the output pulse from the one-shot multivibrator. When the voltage across capacitor 40 drops below its quiescent value by a predetermined amount, transistors 42 and 44 begin to conduct. While transistor 44 is conducting, it connects motor 1 between center tap 16 and the positive terminal of battery 15. As a result, a substantial energizing current flows through the winding of motor 1 in the opposite direction, thereby rotating the motor shaft in the opposite direction. As in the case of pulse stretching circuit 6, the sides of the push-pull stages comprising motor drive amplifier 7, namely transistors 41 and 43 are transistors 42 and 44, conduct alternatively.

Capacitor 40 serves to prolong the effect of the pulses at summing junction 5. The value of capacitor 40 is selected so the voltage across it actuates the motor drive amplifier for the entire time interval between command pulses when the difference in duration between the command pulses and the output pulses from the one-shot multivibrator is large. When the difference in duration becomes small, the votage across capacitor 40 is such that the motor drive amplifier is actuated only during part of the interval between successive command signal pulses. In the latter case, motor 1 is urged gradually in steps toward its null position so that smooth motor operation occurs.

A portion of the voltage applied to motor 1 is coupled by negative feedback through resistor 55 to the junction of resistors 18, 19, and 20 and from there through resistor 19 to one terminal of capacitors 2 and 24. The feedback signal changes the error signal at summing junction 5 to provide damping so the potential at summing junction 5 changes slightly in advance of the actual motor shaft position. Thus, the corrective action provided by the servo system stops slightly before motor 1 reaches its null position, thereby preventing overshoot. The low pass filter formed by resistor 53 and capacitor 54 prevents the high frequency noise from being fed back by resistor 55.

In FIG. 3, variable capacitor 2 is shown in detail. It is conventional in all respects, except for a flexible jumper wire 60. Capacitor 2 has a plurality of rotor plates 61, 62, 63, and 64 fixed to a rotor shaft 65 and a plurality of stator plates 66, 67, 68, and 69 fixed to a stationary bus bar 70. Shaft 65 is rotatably supported by fixed shaft bearing plates 75 and 76, which are part of the capacitor housing. A terminal tab 77 provides an electrical connection from the circuitry of FIG. 2 through bus bar 70 to stator plates 66–69. A terminal tab 78 provides an electrical connection from the circuitry of FIG. 2 through bearing plate 75 and shaft 65 to rotor plates 61–64. As shaft 65 is rotated by motor 1 to change the capacitance, the rotary bearing connection between shaft 65 and plate 75 wears, thereby causing unreliable capacitor performance and eventual malfunction. Jumper wire 60 is connected between tab 78 and a tab 79 fixed to shaft 65, so as to provide a parallel electrical connection from tab 78 to rotor plates 61–64 which does not include rubbing parts. This prolongs the service life of the capacitor substantially. Since jumper wire 60 is flexible, it does not interfere with the rotation of shaft 65.

What is claimed is:
1. A positional servo system comprising:
  a motor having a shaft, the position of which changes responsive to the application of a motor drive signal to its control winding;
  means for generating pulses the duration of which represents the position of the motor shaft;
  a source of command pulses the duration of which represents a desired motor shaft position;
  means for combining the command pulses and the generated pulses to produce error pulses the duration of which represents the difference in duration between the combined pulses and the polarity of which represents which one of the combined pulses has a longer duration;
  a pulse prolonging capacitor;
  means for applying the error pulses to the pulse prolonging capacitor;
  a first motor drive amplifier having an input and an output;
  a second motor drive amplifier having an input connected to the input of the first amplifier and an output connected to the output of the first amplifier;
  means for connecting the inputs of the first and second amplifiers across the pulse prolonging capacitor;
  means for biasing the ampliers such that error pulses of one polarity render only one of said amplifiers conductive and error pulses of the other polarity render only the other of said amplifiers conducitve; and
  means for connecting the outputs of the first and second amplifiers across the control winding of the motor so the conductive amplifier products at its output a motor drive signal responsive to said error signal;
  the value of the pulse prolonging capacitor being selected such that the voltage thereacross actuates the motor drive amplifier for the entire time interval between command pulses when the error pulses have long duration and for only a portion of such interval when the error pulses have short duration.

2. The positional servo system of claim 1 wherein the means for applying the error pulses to the pulse prolonging capacitor comprises third and fourth amplifiers having interconnected inputs and interconnected outputs, the error pulses being applied to the interconnected inputs;

means for biasing said third and fourth amplifiers such that error pulses of one polarity render only one of said third and fourth amplifiers conductive and error pulses of the other polarity render only the other of said third and fourth amplifiers conductive; and means for connecting the interconnected outputs of said third and fourth amplifiers across the pulse prolonging capacitor.

3. The positional servo system of claim 2 wherein the first and second motor drive amplifiers each comprise two opposite conductivity type transistors connected in tandem in the common emitter configuration, the transistors of the amplifiers being of opposite conductivity type from each other, and connected in push-pull relation such that both can never be rendered conductive at the same time.

4. The positional servo system of claim 3 wherein the third and fourth amplifiers are transistors of opposite conductivity type and are connected in push-pull relation in the common emitter configuration such that both can never be rendered conductive at the same time.

5. The positional servo system of claim 1 wherein said first and second motor drive amplifiers each comprise two opposite conductivity type transistors connected in tandem in the common emitter configuration, the transistors of the amplifiers being of opposite conductivity type from each other and connected in push-pull relation such that both can never be rendered conductive at the same time, 6. The positional servo system of claim 1 in which the means for generating pulses the duration of which represents the position of the motor shaft is a one-shot multivibrator being triggered responsive to the leading edge of each command pulse;

the error pulses being of one polarity when the duration of the multivibrator output pulses is greater than the command pulses and the other polarity when the duration of the command pulses is greater than the multivibrator output pulses.

7. The positional servo system of claim 6 in which the one-shot multivibrator has a normally cutoff common emitter transistor stage and a normally conducting common emitter transistor stage; and the command pulses are applied to the collector of the normally cutoff transistor stage so that the leading edge of each command pulse triggers the one-shot multivibrator to bring the normally cutoff transistor stage into conduction, thereby clamping the collector of the normally cutoff transistor stage to the potential of its emitter.

8. The positional servo system of claim 1 in which the means for generating pulses the duration of which represents the position of the motor shaft includes a variable timing capacitor coupled to the motor shaft such that its capacitance is a function of the position of the motor shaft, said capacitor having a rotor plate fixed to a rotatable shaft, a fixed terminal electrically connected to the rotor plate through a rotary bearing including the shaft, and a flexible jumper wire connected between the shaft and the terminal to provide a parallel electrical connection.

9. A positional servo system comprising:

a motor having a shaft the position of which changes responsive to the application of a motor drive signal to its control winding;

a variable impedance mechanically coupled to the motor shaft such that its impedance represents the position of the motor shaft;

a one-shot multivibrator having a timing circuit that determines the duration of the pulses generated by the multivibrator, the variable impedance being part of the timing circuit such that the duration of the pulses generated by the multivibrator represents the impedance of the variable impedance;

a source of command pulses the duration of which represents the desired motor shaft position;

means for producing a motor drive signal representative of the difference in the duration of the command pulses and the multivibrator pulses;

means for applying the motor drive signal to the control winding of the motor in a sense to reduce the difference in the duration of the command pulses and the multivibrator pulses; and a negative feedback connection coupling the motor control winding to the timing circuit of the multivibrator such as to change the motor drive signal slightly in advance of the shaft position of the motor.

10. The positional servo system of claim 9 in which the variable impedance is a variable capacitor.

11. The positional servo system of claim 9 in which the one-shot multivibrator has a normally cutoff common emitter transistor stage and a normally conducting common emitter transistor stage and has the command pulses applied to the collector of its normally cutoff transistor stage so that the leading edge of each command pulse triggers the one-shot multivibrator to bring the normally cutoff transistor stage into conduction, thereby clamping the collector of the normally cutoff transistor stage to the potential of its emitter.

12. The positional servo system of claim 9 further comprising means for combining the command pulses and the multivibrator pulses to produce error pulses the duration of which represents the difference between the combined pulses and the polarity of which represents which of the combined pulses has a longer duration, the motor drive signal being produced from the error pulses.

13. The positional servo system of claim 12 in which the means for applying the motor drive signal to the control winding of the motor comprises:

a pulse prolonging capacitor;

means for applying the error pulses to the pulse prolonging capacitor;

a first motor drive amplifier having an input and an output;

a second motor drive amplifier having an input connected to the input of the first motor drive amplifier and an output connected to the output of the first motor drive amplifier;

means for connecting the outputs of the first and second motor drive amplifiers across the control winding of the motor; and means for connecting the inputs of the first and second motor drive amplifiers across the pulse prolonging capacitor.

14. The positional servo system of claim 13, in which the first and second motor drive amplifiers each comprise two opposite conductivity type transistors connected in tandem in the common emitter configuration, the transistors of the first and second amplifiers being of opposite conductivity type from each other and connected in push-pull relation such that both can never be rendered conductive at the same time, and the means for applying the error pulses to the pulse prolonging capacitors comprises a first common emitter transistor stage having an input and an output and a second common emitter transistor stage having an input connected to the input of the first stage and an output connected to the output of the first stage, the first and second stages being of opposite conductivity type from each other and connected in push-pull relation such that both can never be rendered conductive at the same time, the outputs of the first and second stages being connected across the pulse prolonging capacitor and the error pulses being applied to the inputs of the first and second stages.

15. The positional servo system of claim 9 in which the variable impedance means is a variable capacitor having a rotor plate fixed to a rotatable shaft, a fixed terminal electrically connected to the rotor plate through a rotary bearing including the shaft, and a flexible jumper wire connected between the shaft and the terminal to provide a parallel electrical connection.

References Cited

UNITED STATES PATENTS

| | | |
|---|---|---|
| 2,588,742 | 3/1952 | McCallum. |
| 2,588,743 | 3/1952 | McCallum. |
| 2,887,642 | 5/1959 | Ehret et al. |
| 3,052,832 | 9/1962 | Lewis et al. |
| 3,110,851 | 11/1963 | Plogstedt et al. |
| 3,260,912 | 7/1966 | Gregory. |
| 3,323,031 | 5/1967 | Kaspor et al. |
| 3,378,739 | 4/1968 | Livengood et al. |
| 3,422,326 | 1/1969 | White et al. |
| 3,427,520 | 2/1969 | Oppendahl. |

THOMAS E. LYNCH, Primary Examiner

U.S. Cl. X.R.

318—28